United States Patent [19]

Nuesmeyer et al.

[11] Patent Number: 4,922,889
[45] Date of Patent: May 8, 1990

[54] PELLETIZED FUEL BURNING HEATER

[75] Inventors: David Nuesmeyer, Spokane; Gary Brondt, Cheney, both of Wash.

[73] Assignee: Thermic, Inc., Spokane, Wash.

[21] Appl. No.: 102,481

[22] Filed: Sep. 29, 1987

[51] Int. Cl.$^5$ .......................... F24B 13/04; F24B 5/02
[52] U.S. Cl. ..................... 126/73; 110/283; 110/300; 110/310; 126/77; 126/146; 126/83; 126/312; 126/112
[58] Field of Search ............ 126/73, 76, 77, 83, 126/146, 299 R, 299 D, 112, 85 B, 312; 110/210, 211, 214, 283, 284, 288, 300, 310, 311

[56] References Cited

U.S. PATENT DOCUMENTS

| | | | |
|---|---|---|---|
| 560,274 | 5/1896 | Moon | 126/77 |
| 749,059 | 1/1904 | Helwig et al. | 126/77 |
| 1,576,251 | 3/1926 | Sponsel | 126/146 X |
| 1,648,622 | 11/1927 | Ridgely | 126/146 |
| 1,952,227 | 3/1934 | Adams | 126/146 X |
| 2,400,900 | 5/1946 | Agricola | 126/77 |
| 2,414,147 | 1/1947 | Fleer | 126/77 |
| 2,419,379 | 4/1947 | Tindell, Jr. | 126/73 |
| 2,545,680 | 3/1951 | Wyatt | 126/68 |
| 4,262,608 | 4/1981 | Jackson | 110/162 |
| 4,290,410 | 9/1981 | Trainer | 126/146 |
| 4,343,288 | 8/1982 | Tjosvold | 126/112 |
| 4,424,792 | 1/1984 | Shimek et al. | 126/80 |
| 4,516,562 | 5/1985 | Hultgren | 126/77 |
| 4,565,184 | 1/1986 | Collins et al. | 126/368 |

Primary Examiner—Samuel Scott
Assistant Examiner—Allen J. Flanigan
Attorney, Agent, or Firm—B. Peter Barndt

[57] ABSTRACT

A heater for burning combustible pelletized fuel. The pelletized fuel is delivered at a controllable rate to a double-walled burn pot in an enclosed combustion chamber. Combustion air is injected into the combustion chamber at a pressure higher than the ambient air pressure surrounding the heater. Combustion air is injected between the walls of the burn pot through ports in the inner wall into the fuel at or slightly below the top of the fuel level. Additional combustion air is injected approximately horizontally across the top of the burn pot through an injection air manifold. Crossfire injection air is injected approximately vertically about the periphery of the burn pot, confining fumes and exhaust air directly above the burn pot. Heated exhaust gasses rise to the top of the combustion chamber and are drawn from the combustion chamber through a heat exchange unit surrounding the combustion chamber. The exhaust gasses are drawn from the combustion chamber by suction created by and extraction air mechanism. Both the injection air supply and the suction for extracting exhaust gasses are provided by a single hybrid injection air/extraction air blower assembly.

21 Claims, 5 Drawing Sheets

PELLETIZED FUEL BURNING HEATER

TECHNICAL FIELD OF THE INVENTION

The present invention relates to heating by combustion of bio-mass fuels.

BACKGROUND OF THE INVENTION

Many attempts have been made to design and build "stick" woodburning stoves as sources of either auxiliary or primary heat for residences and other structures. Such stoves have generally been inefficient, not completely burning the wood used for fuel. Large amounts of ash, unburned fuel and soot were left after the combustion process was completed. This was in part due to the inefficient design of the stoves themselves, and in part due to the varying size, shape and composition of the wood fuels which were used.

In an attempt to increase efficiency, stoves have been designed to burn "pelletized" fuel, which can be made from a wide variety of organic material. Such pelletized bio-mass fuels generally have a uniform or near uniform size, shape, moisture content, and composition. With the pellets having such consistency, the combustion of individual pellets is also uniform or near uniform, since the individual pellets of fuel have essentially the same surface area and composition.

In addition to the uniformity in size, shape and composition of fuel used in pellet stoves, another factor which greatly influences the efficiency of the combustion process in these stoves is the flow of combustion air into and around the area in which the fuel is burned.

"Pellet" stoves have been designed with control of the air flow through the combustion and exhaust system. One such type blows air into the combustion chamber by forcing the air at a pressure somewhat higher than the ambient air pressure into the combustion chamber. This is commonly known as "forced draft". This type of stove can have severe leaks of smoke and fumes into the area surrounding the stove if a leak develops anywhere in the entire system. This method also limits heat transfer ability due to the problems inherent in forcing exhaust gases through restricted heat exchangers.

Still another method which has been utilized is shown in U.S. Pat. No. 4,565,184 to Collins, et al. The Collins patent uses an exhaust fan to: (1) draw air through an input port or ports into the combustion chamber and; (2) out of the stove through the heat exchanger by decreasing the air pressure at the exhaust port below that of the ambient air pressure. This is commonly know as "induced draft".

This exhaust type of design is susceptible to air leaking "into" the stove which greatly reduce its efficiency. The entire system must be kept completely airtight. In addition, soot and fly ash are common residues of pellet stoves. As these byproducts collect in the heat exchanger and blower assembly, efficiency is greatly reduced. This is due to the rapid decline in the blower performance as air flow restrictions increase.

BRIEF DESCRIPTIONS OF THE DRAWINGS

The preferred embodiment of the invention is illustrated in the accompanying drawings, in which.

DETAILED DESCRIPTION OF THE PREFERRED EMBODIMENT

Figure 1:
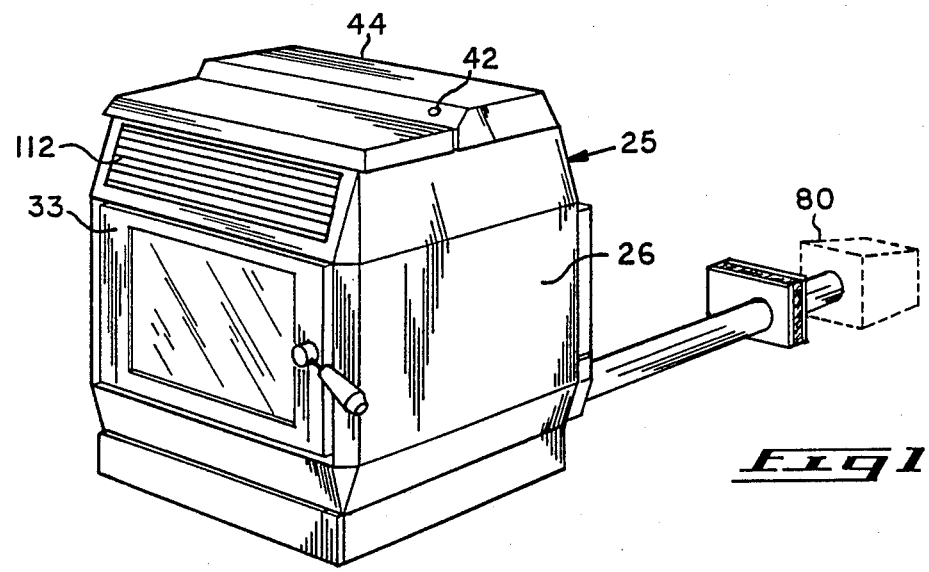
FIG. 1 is a perspective view of the preferred embodiment of the present invention.

The present invention is primarily intended to burn "pelletized" bio-mass type fuel. This kind of fuel can be made from a variety of organic materials, including garbage. The pellets are generally of uniform or near uniform size, shape and composition which allows for consistent burning from one individual pellet to another.

The preferred embodiment of the instant invention is shown in the drawings and designated generally therein by the reference numeral 25. While the preferred embodiment shown in the attached drawings is sized for heating a residential structure, the heater can be made either larger or smaller depending upon the scale of the structure which must be heated.

Figure 3:
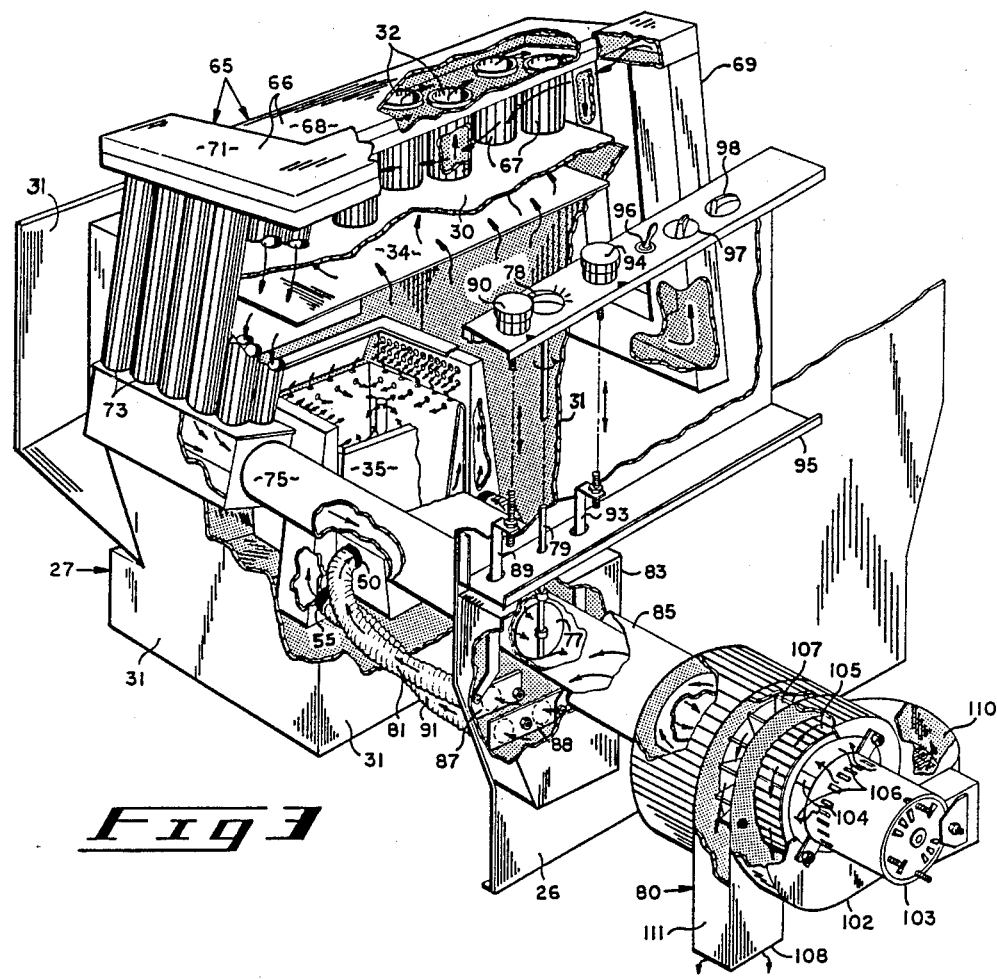
FIG. 3 is a partially fragmented perspective view of the preferred embodiment showing the flow of air through the combustion blower, control valves, combustion chamber, heat exchange system, final extraction tube, and through the combustion blower.
Figure 7:
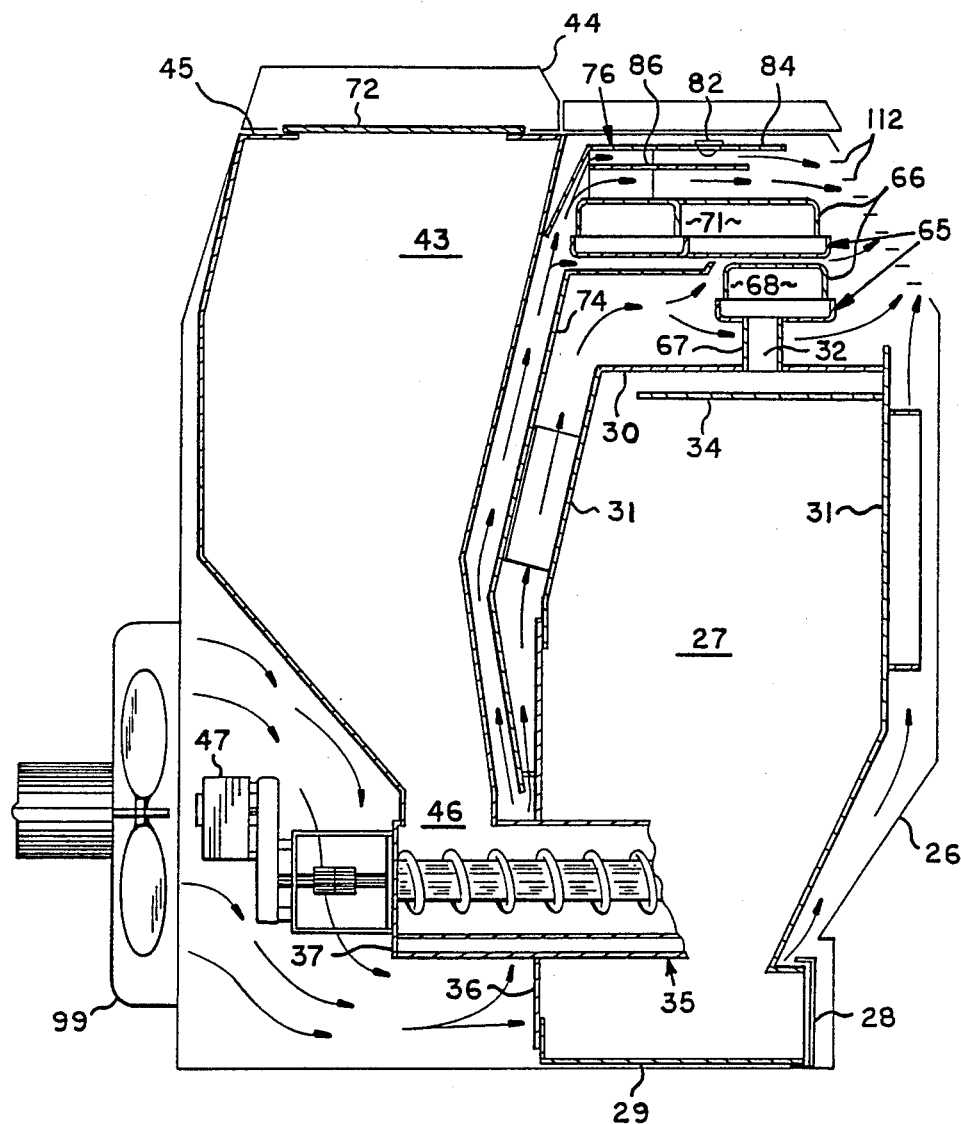
FIG. 7 is a cross-sectional side view of the room fan, gear motor and auger feed system, fuel storage hopper, combustion chamber, heat exchanger system with shield, and outer shell of the preferred embodiment.

The heater 25 has an air tight combustion chamber 27 shown in FIGS. 3, and 7. The combustion chamber 27 has a bottom wall 29 and a top wall 30, joined by side walls 31. One of the side walls 31 has an access door 33 (FIG. 1) for access to the interior of the combustion chamber 27. The combustion chamber 27 also has a cleaning access door 28 (FIG. 7).

Figure 2:
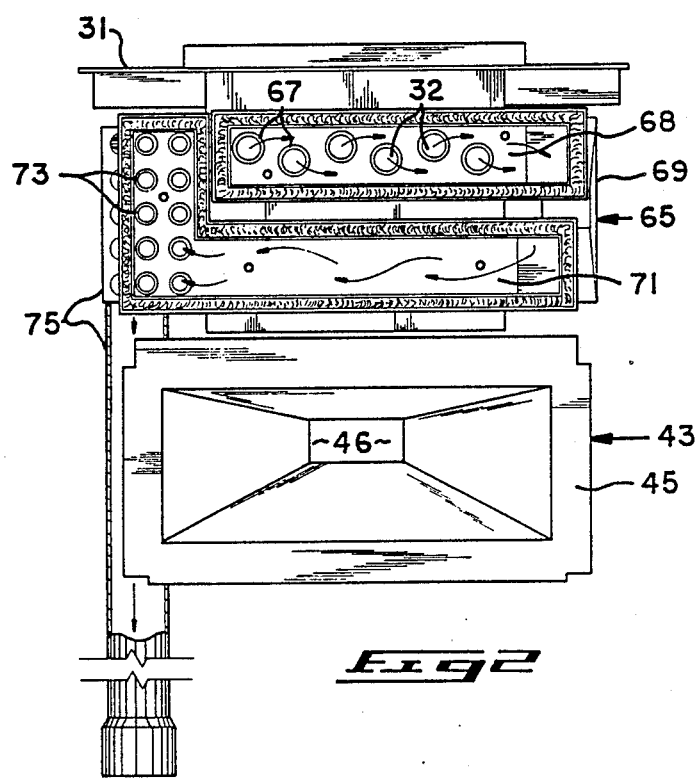
FIG. 2 is a plan view of heat exchanger and storage hopper (with covers removed) of the preferred embodiment.

The top wall 30 of combustion chamber 27 has a number of exhaust ports 32 passing through it, as shown in FIGS. 2, 3 and 7.

The exhaust ports 32 provide a passage for heated exhaust air to be extracted from combustion chamber 27.

As shown in FIGS. 3 and 7, combustion chamber 27 has a baffle 34 positioned adjacent to and below top wall 30. The baffle 34 is preferably an approximately flat metal plate extending across the width of combustion chamber 27 and from the front side wall 31 rearward. The baffle 34 does not extend completely to the rear side wall 31. Baffle 34 directs the flow of combustion air to the rear of combustion chamber 27. This prevents passage of flames through exhaust ports 32.

In the preferred embodiment as shown, the combustion chamber is substantially rectangular in shape. However, it may also be configured in other suitable shapes.

Figure 4:
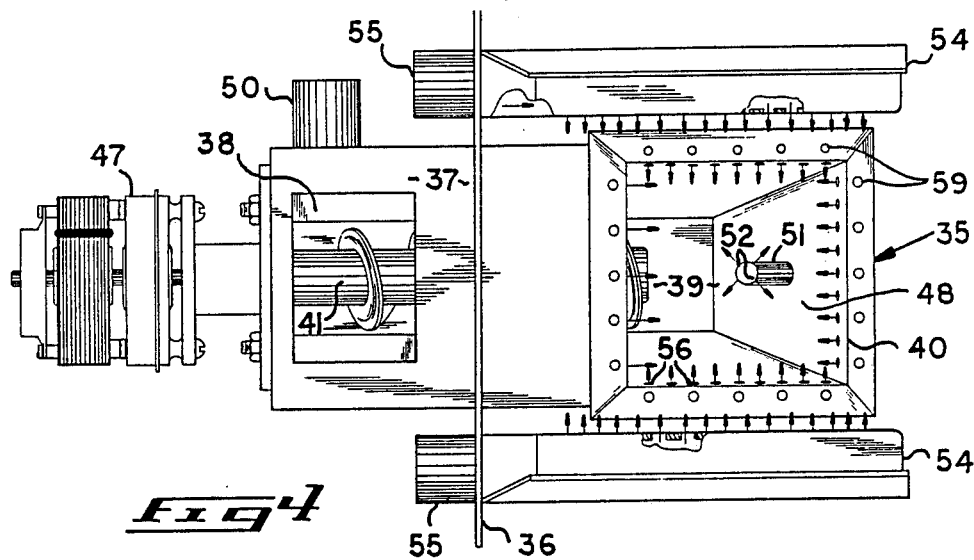
FIG. 4 is a plan view of the burn pot and auger feed of the preferred embodiment.
Figure 5:
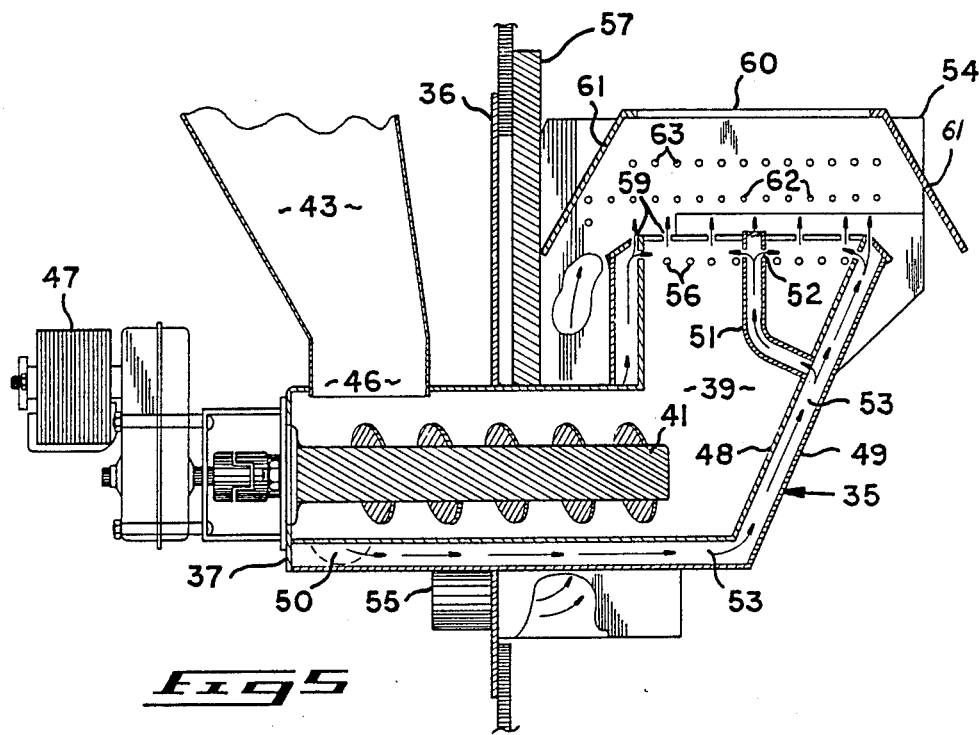
FIG. 5 is a partially fragmented side view of the burn pot, auger feed, and storage hopper.

As shown in FIGS. 3, 4 and 5, a burn pot 35 is located adjacent the bottom wall 29 of combustion chamber 27. In the preferred embodiment, burn pot 35 passes through and is attached to a mounting plate 36. The mounting plate 36 is attached to the exterior of rear side wall 31 of combustion chamber 27.

As shown in FIGS. 4 and 5, feed auger 41 is mounted to the burn pot 35 at its feed end 37. The feed auger 41 is rotatable and delivers the combustible bio-mass fuel through the feed end 37 of burn pot 35 and delivers it to the combustion end 39 of feed pot 35. The bio-mass fuel will normally be mounted above the periphery 40 of combustion end 39. Combustion of the fuel takes place in the area of the periphery 40 of combustion end 39.

The feed end 37 of burn pot 35 has an opening 38 (FIG. 4) in communication with storage hopper 43. The storage hopper 43 has a sealable upper fuel receiving end 45 (FIGS. 2 and 7) and a lower fuel delivery end 46 (FIGS. 2, 5 and 7). The bio-mass fuel is gravity fed from hopper 43 into the opening 38 in feed end 37 of burn pot 35.

The feed auger 41 is driven by a single speed electric gear motor 47 (FIGS. 4, 5 and 7) which is attached to the feed end 37 of burn pot 35.

The storage hopper 43 has a sealed airtight cover 72 (FIG. 7). In the preferred embodiment the cover is magnetically sealed along the periphery of upper fill end 45. The hopper 43 can be accessed through hinged hopper access door 44 in outer shell 26 (FIGS. 1 and 7).

The storage hopper 43 has a low fuel level sensor (not shown) which is activated when approximately 75 per cent of the fuel in hopper 43 has been burned. Activation of the sensor causes an indicator light 42 on the front of the hopper access door 44 to illuminate (FIG. 1).

The sensor consists of a paired light source/receiver mounted on opposite sides of the hopper 43. When sufficient fuel is in the hopper 43, the light is blocked from the receiver. As the fuel level drops the light from the light source is no longer blocked and the indicator light is turned on.

A second set of sensors (not shown) is attached to opposite sides of the storage hopper 43 at delivery end 46. When this sensor is activated feed auger 41 automatically stops (FIGS. 4 and 5), and the combustion blower 80 (FIG. 6) continues to operate for a prescribed time, thereby lowering the fuel mound in burn pot 35 and then purging combustion chamber 27 and heat exchanger assembly 65 (FIGS. 2, 3, and 7) of residual gases. Room fan 99 (FIG. 7) continues to operate for a prescribed time to reduce the overall temperature of the entire embodiment 25.

Figure 6:
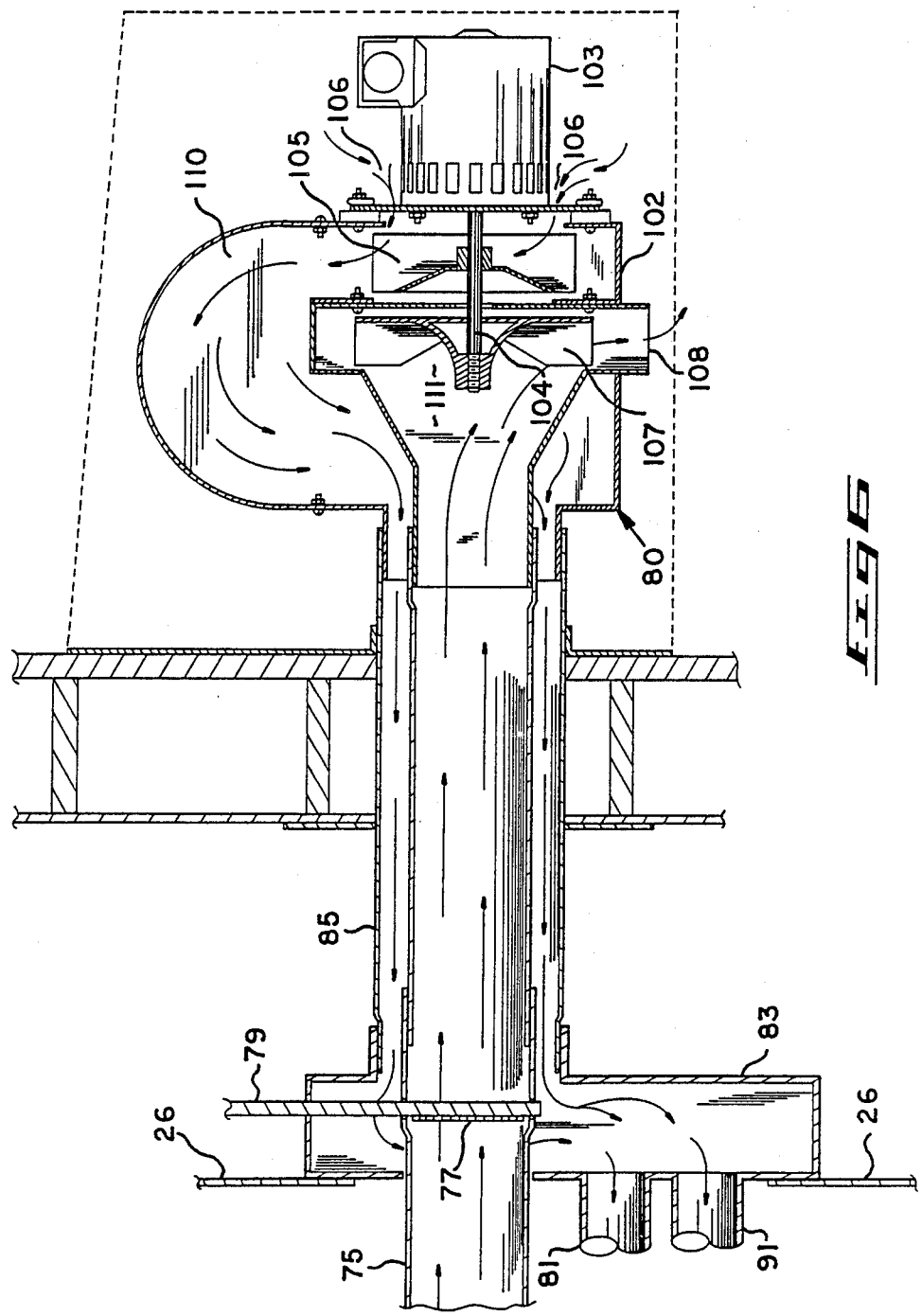
FIG. 6 is a cross-sectional view of the combustion blower (air injection/extraction unit) of the preferred embodiment. Also shown is a cross-sectional view of the final extraction tube and air delivery tube passing through a structure's exterior wall, and a cross-sectional view of the air flow control box.

As shown in FIGS. 6, the burn pot 35 is of doublewalled construction, having an inner wall 48 and an outer wall 49. Both walls 48 and 49 outwardly diverge from bottom to top. A plenum 53 is formed between the inner wall 48 and the outer wall 49. The plenum 53 is adapted to receive combustion air through underfire/-crossfire air inlet 50. As shown in FIGS. 3, 4 and 5, extending around the inner sides of inner wall 48 near the periphery of combustion end 39 are a series of underfire air holes 56. The underfire air holes 56 allow a flow of underfire combustion air to be injected approximately horizontally from the plenum 53 into the burning fuel to provide primary combustion.

As shown in FIGS. 3, 4 and 5, a hollow underfire air tube 51 is also mounted to the inner wall 48 of burn pot 35. The interior of tube 51 is in communication with plenum 53. A series of holes 52 are formed through the exterior of underfire air tube 51 near its upper end. Additional underfire combustion air, form plenum 53, is injected into air tube 51 and through holes 52 into the burning fuel to increase combustion efficiency.

As shown in FIGS. 3, 4 and 5, a series of crossfire air holes 59 are spaced along the upper edge of the periphery 40 of combustion end 39 of burn pot 35, and are in communication with plenum 53. Crossfire combustion air is injected through crossfire holes 59 in a substantially vertical direction thereby containing the burning gasses within the periphery 40 of, and directly over burn pot 35.

Assisting this process is a flame trap 60 (FIG. 3 and 5) which is placed about the upper end of the overfire manifold 54. The flame trap 60 has end walls 61, that extend from the upper edge of overfire manifolds 54 downward at a diverging angle to a point approximately level with the periphery 40 of burn pot 35. End walls 61 of flame trap 60 channel crossfire air toward the center of the burn area.

As shown in FIGS. 3, 4 and 5, additional combustion air is injected through a pair of overfire combustion air manifolds 54. The overfire combustion air manifolds 54 are attached to mounting plate 36 at either side of burn pot 35. The overfire combustion air manifolds 54 have air inlets 55 at their lower ends.

As shown in FIGS. 3, 4, and 5, across the upper end of overfire combustion air manifolds 54 are a series of overfire air holes 62 and 63 in communication with the interior air passage of manifolds 54. The overfire air holes 62 and 63 are present in the preferred embodiment in two parallel rows, one above the other, which extend laterally beyond the front and rear of burn pot 35. The lower holes 62 are smaller in diameter than the upper holes 63. These lower holes 62 perform two functions: (1) they deflect crossfire air towards the center of the area over burn pot 35; and (2) inject streams of air directly over the periphery 40. These functions serve to provide additional combustion air to foster the burning of rising gases and confine the flames to a region directly over the burn area. The upper holes 63 direct a stream of combustion air into the uppermost region of the flaming gases to complete the combustion process. This secondary combustion process is a result of the combination of crossfire and overfire air.

Located between mounting plate 36 of burn pot 35 and rear wall 61 of flame trap 60 and resting on overfire combustion air manifolds 54 are shaped firebricks 57 or other equivalent refractory material (FIG. 5).

As shown in FIGS. 2, 3 and 7, the present invention has a heat exchange assembly 65 positioned about the top and sides of combustion chamber 27. The heat exchange assembly 65 has removable covers 66 (FIGS. 3 and 7). The covers 66 allow access into heat exchange assembly 65 for cleaning.

As shown in FIGS. 2, 3 and 7, the heat exchange assembly 65 has exhaust receiving tubes 67. The exhaust receiving tubes 67 provide a air passages, exhaust ports 32, for combustion air extracted from combustion chamber 27 to move into heat exchange assembly 65. The exhaust receiving tubes 67 are in communication with, and joined to a first exhaust manifold 68, positioned above the top of combustion chamber 27.

As shown in FIGS. 2 and 3, attached to the end of first exhaust manifold 68 is a monotube 69. Monotube 69 extends downward and returns upward along the side of combustion chamber 27.

As shown in FIGS. 2 and 3, attached to the opposite end of monotube 69 is a second exhaust manifold 71. The second exhaust manifold 71 is also positioned above the top of combustion chamber 27. In communication with, and attached to second exhaust manifold 71 are the upper ends of multitubes 73. The lower ends of multitubes 73 are in communication with, and attached to the final extraction tube 75 (FIGS. 2 and 3).

As shown in FIGS. 3 and 6, the final extraction tube 75 extends through the rear of outer shell 26 and through the air flow control box 83. Final extraction tube 75 extends outward to the exterior of the structure in which the heater is located. At the exterior of the structure (FIG. 6) final extraction tube 75 is attached to a combustion blower assembly 80.

As shown in FIGS. 3 and 6, near the point at which final extraction tube 75 passes through the rear of outer shell 26, a vacuum control valve 77 is located in final extraction tube 75. As shown, the vacuum control valve is a butterfly valve and can be selectively set by turning vacuum control knob 78 which is connected to vacuum control valve 77 through vacuum control linkage 79. Rotating control knob 78 causes the control valve 77 to pivot, selectively restricting the passage of exhaust gasses through final extraction tube 75.

As shown in FIG. 3 and 6, the combustion air supply tube 85 surrounds final extraction tube 75 between the combustion blower assembly 80 and the air flow control box 83, providing outside air to the air flow control box. This configuration both cools final extraction tube 75 and provides insulation between final extraction tube 75 and the structure wall through which it extends. Both the final extraction tube 75 and the combustion air supply tube 85 are made up of one or more sections of tubing.

As shown in FIG. 3, gating valves 87 and 88 are mounted in air flow control box 83. Gating valve 87 controls the flow of air into the combustion air delivery tube 81. Combustion air delivery tube 81 supplies air to underfire/crossfire air inlet tube 50 in burn pot 35 (FIGS. 4 and 5).

As shown in FIG. 3, attached to the gating valve 87 is gating valve control linkage 89. At the opposite end of gating valve control linkage 89, is an underfire/crossfire air control knob 90. Air control knob 90 selectively restricts the flow of underfire/crossfire combustion air by positioning the gating valve 87.

Gating valve 88 controls the flow of air into combustion air delivery tubes 91. Combustion air delivery tubes 91 supply air to overfire air inlets 55 in combustion air manifolds 54 (FIGS. 3, 4 and 5). Attached to the overfire gating valve 88 is the overfire control linkage 93. At the opposite end of gating valve control linkage 93, is and overfire control knob 94. Air control knob 94 selectively restricts the flow of overfire combustion air by the positioning of gating valve 88.

As shown in FIG. 3, vacuum control knob 78, underfire/crossfire air control knob 90, and overfire air control knob 94 are used in conjunction with fuel rate/fan speed control knob 97 as is more fully described below.

As shown in FIG. 7, room fan 99 is mounted at the rear of outer shell 26. As it rotates, room fan 99 initially forces ambient room air around gear motor 47 and feed end 37 of burn pot 35, thereby dissipating heat. It further forces ambient room air into the space between: (1) combustion chamber 27 and hopper shield 74; (2) hopper shield 74 and storage hopper 43; (3) combustion chamber 27 and heat exchange assembly 65; (4) heat exchange assembly 65 and thermostat shield assembly 76; and, (5) combustion chamber 27 and outer shell 26. The ambient room air forced through the heater exits the heater through a grill 112 (FIGS. 1 and 7) located at the upper front end of the outer shell 26.

As shown in FIG. 7, thermostat shield assembly 76 is comprised of two sections: The upper section 84, and the lower section 86. Mounted in the upper section 84 is a high limit thermostat switch 82. If forced air flow between section 84 and section 86 ceases, heat from heat exchange assembly 65 will rise vertically into the space between section 84 and 86 causing high limit thermostat switch 82 to open, thereby interrupting the flow of electrical power.

As shown in FIG. 3, the present invention has an electrical control box 95 which in the preferred embodiment is mounted to the rear wall of the outer shell 26. The electrical control box 95 contains the electronic circuitry (not shown) for providing on/off signals to the combustion blower assembly 80, fuel feed rate control signals to the electric gear motor 47, and speed control signals to the room fan 99. The electrical control box 95 has a master on/off switch 96. Also mounted to control box 95 is fuel rate/fan speed control switch 97. The fuel rate/fan speed control switch 97: (1) controls the rate at which fuel is fed into the burn pot 35, and; (2) selects predetermined speed ranges for room fan 99. Room fan control knob 98 is also mounted to control box 95. The room fan speed knob 98 allows variation of RPM of room fan 99 within selected predetermined speed ranges, set by switch 97.

In the preferred embodiment, the combustion blower assembly 80, as illustrated in FIGS. 3 and 6, is a hybrid blower which combines both the functions of a forced draft system and the functions of a power venting system. The combustion blower assembly 80 has an outer housing 102 comprised of two sections. The first is a forced draft or injection section 110. The second is a power vent or extraction section 111. The injection and extraction sections 110 and 111 are isolated.

The injection section 110 has ports 106 extending through it for passage of outside air. The extraction section 111 has an exhaust duct 108 through which exhaust gasses are vented to the outside air.

A conventional electric motor 103 is attached to the end of outer housing 102. Extending from the motor 103 is a blower shaft 104. Attached to the blower shaft 104 adjacent the end of blower motor 103 is an injection air fan 105. The injection air fan 105 is adapted to draw ambient outside air through ports 106. Injection air fan 105 then forces the injection air through the injection section 110 and into combustion air supply tube 85.

The combustion air supply tube 85 is in sealed engagement at one end with the injection section 110, and is in sealed engagement with the air flow control box 83 at its opposite end.

Also attached to blower shaft 104 is an extraction air fan 107. Extraction air fan 107 draws extraction air through final extraction tube 75 and forces it throuhg exhaust port 108 into the atmosphere. Prior to initial operation of the heater, the underfire/crossfire gating valve control linkage 89 and the overfire gating control linkage 93 are adjusted to provide proper air flow into underfire/crossfire air delivery tube 81 and overfire air delivery tube 91. The settings are adjusted so that proper primary and secondary combustion are achieved (FIG. 3).

As shown in FIGS. 3, 4, 5 and 6, positive air pressure is maintained at all points from the injection section 110 of outer housing 102 to underfire holes 52 and 56, crossfire holes 59 of burn pot 35, and to overfire holes 62 and 63 of overfire air manifolds 54 (FIGS. 5 and 6).

From holes 52, 56, 59, 62 and 63 and through final extraction tube 75, a slight negative pressure is maintained by vacuum control valve 77. Vacuum control valve 77 is initially adjusted with vacuum control linkage 79. This negative air pressure can also be readjusted after the heater has been in operation to compensate for any air leaks that may develop in combustion chamber 27 or heat exchanger assembly 65. By maintaining the proper negative air pressure, maximum overall efficiency is assured and any possible leakage of fumes into the structure in which the heater is installed will be prevented.

To operate the heater, pelletized bio-mass fuel would first be deposited into hopper 43 and the hopper seal 72 closed. The master on/off switch 96 would then be placed to the "on" position and the desired feed rate would be set on feed rate/fan speed switch 97. At the same time, the user would adjust vacuum control valve 78, overfire control knob 94, and underfire/crossfire control knob 90. The user adjusts these controls by matching the number at which each of the control knobs is set to the number at which the fuel rate/fan speed switch 97 is set. When all the control knobs are set on matching numbers the injection air and extraction air are properly matched with the fuel feed rate.

When the pelletized fuel reaches the top of burn pot 35 the user of the heater would light the fuel and close access door 33. The heater would operated at the set speed until changed by the user.

In compliance with the statute, the invention has been described in language more or less specific as to structural features. It is to be understood however, that the invention is not limited to the specific features shown, since the means and construction herein disclosed comprise a preferred form of putting the invention into effect. The invention is therefore, claimed in any of its forms or modifications within the proper scope of the appended claims, appropriately interpreted in accordance with the doctrine of equivalents.

We claim:

1. A bio-mass fuel burning heater, comprising:
    a combustion chamber having top and bottom ends with side walls extending between the top and bottom ends;
    pot means for holding the bio-mass fuel, the pot means located adjacent to the lower end of the combustion chamber, the pot means having an open upper combustion end and an open lower fuel feed end passing through a side wall of the combustion chamber;
    an enclosure surrounding the combustion chamber and pot means;
    air manifold means within the combustion chamber for delivering combustion air above the combustion end of the pot means;
    first combustion air supply means positioned around at least part of the periphery of the combustion end of the pot means for supplying combustion air to the pot means;
    second combustion air supply means within the combustion chamber for directing a stream of combustion air about at least part of the periphery of the combustion end of the pot means in an upward direction from the combustion end of the pot means;
    an exhaust duct opening into the combustion chamber;
    air injection means attached to the first and second combustion air supply means and to the air manifold means for drawing air from the ambient atmosphere and injecting it into the first and second combustion air supply means and into the air manifold means, with an area of pressure higher than the ambient atmospheric pressure being created in the area of the combustion end of the pot means;
    air extraction means attached to the exhaust duct for producing a lower pressure at the top end of the combustion chamber than the ambient atmospheric pressure to draw exhaust gasses from the combustion chamber; and
    pressure control means attached to the enclosure for controlling air flow through the air injection means and air extraction means.

2. The bio-mass fuel burning heater of claim 1, further comprising: heat exchange means disposed about the combustion chamber for receiving heat from the combustion chamber and transmitting it to the area around the heater.

3. The bio-mass fuel burning heater of claim 1 further comprising:
    heat exchange means disposed about the combustion chamber for receiving heat from the combustion chamber and transmitting it to the area around the heater;
    hopper means within the enclosure for storage of the fuel;
    and feed means in the lower end of the pot means for feeding fuel from the hopper to the lower end of the pot means.

4. The bio-mass fuel burning heater of claim 3, further comprising:
    blower means for circulating ambient air around the heat exchange means.

5. The bio-mass fuel burning heater of claim 3, further comprising:
    control means attached to the enclosure for controlling the rate of feed of the feed means.

6. The bio-mass fuel burning heater of claim 1, wherein the pot means is double walled with an outer wall and inner wall having ports extending through the inner wall; and
    wherein at least a part of the combustion air is injected between the inner wall and the outer wall through the ports into the interior of the pot means.

7. The bio-mass fuel burning heater of claim 6, further comprising;
    flame control means disposed about the periphery of the combustion end of the burn pot for confining fumes resulting from combustion of the fuel directly above the pot means;

8. A bio-mass fuel burning heater, comprising:
    a combustion chamber having top and bottom ends with side walls extending between the top and bottom ends;
    pot means for holding the bio-mass fuel, the pot means located adjacent the bottom end of the combustion chamber, the pot means having an open upper combustion end and an open lower fuel feed end passing through a side wall of the combustion chamber;
    an enclosure surrounding the combustion chamber and the pot means;

underfire air delivery means for delivering combustion air into the combustion end of the pot means, the underfire air delivery means being positioned about at least part of the periphery of the combustion end of the pot means;

overfire air delivery means located in the combustion chamber above the combustion end of the pot means for delivering combustion air over the combustion end of the pot means;

crossfire air delivery means around the periphery of the combustion end of the pot means for delivering air at approximately a right angle to the air delivered by the overfire air delivery means;

a flame trap positioned over the combustion end of the pot means;

air injection means extending through the enclosure and attached to the underfire air delivery means, the overfire air delivery means and the crossfire air delivery means for injecting ambient air into the combustion chamber at a pressure higher than the ambient atmosphere surrounding the heater;

an exhaust duct extending through the enclosure into the combustion chamber;

air extraction means attached to the exhaust duct for extracting exhaust gasses from the combustion chamber;

injection air control means attached to the enclosure for controlling the amount of air delivered into the combustion chamber by the air injection means; and extraction air control means attached to the enclosure for controlling the amount of exhaust gasses removed by the air extraction means.

9. The bio-mass burning heater of claim 8, further comprising:

heat exchange means disposed about the combustion chamber for receiving heat from the exhaust gasses and transmitting it to the area around the heater, the heat exchange means being adapted to receive exhaust gasses through the exhaust duct and exhaust them into the air extraction means.

10. The bio-mass burning heater of claim 9, further comprising:

a storage hopper for storage of the bio-mass fuel; and feed means in the fuel feed end of the pot means for feeding fuel from the hopper to the combustion end of the pot means.

11. The bio-mass fuel burning heater of claim 10, further comprising:

control means for controlling the rate of feed of fuel from the storage hopper to the fuel feed end of the pot means.

12. The bio-mass fuel burning heater of claim 8, further comprising:

a blower fan for blowing ambient air around the combustion chamber and the heat exchange means.

13. The bio-mass fuel burning heater of claim 8, wherein the pot means is of double walled construction, having an outer wall and an inner wall, the inner wall and outer wall being joined at their upper ends along the periphery of the combustion end of the pot means, the inner wall having ports extending through it adjacent the periphery of the combustion end of the pot means, the pot means further having ports extending along the periphery of the combustion end;

wherein the underfire air delivery means consists of the ports through the inner wall of the burn pot; and wherein the crossfire air delivery means consists of the ports through the periphery of the combustion end of the pot means.

14. A bio-mass fuel burning heater, comprising:

a combustion chamber having top and bottom ends with side walls extending between the top and bottom ends, the side walls being approximately vertical;

a burn pot for holding the bio-mass fuel, the burn pot located adjacent the bottom end of the combustion chamber, the burn pot having an open upper combustion end and an open lower fuel feed end passing through a side wall of the combustion chamber;

an enclosure surrounding the combustion chamber and the burn pot;

an underfire air delivery manifold mounted within the combustion chamber extending around at least part of the periphery of the combustion end of the burn pot, the underfire air delivery manifold being adapted to deliver combustion air below the level of the bio-mass fuel within the burn pot to support combustion thereof;

an overfire air delivery manifold mounted within the combustion chamber on opposing sides above the periphery of the combustion end of the burn pot, the overfire air delivery manifolds being adapted to deliver combustion air to the area above the combustion end of the burn pot;

a crossfire air delivery manifold located within the combustion chamber about the periphery of the combustion end of the burn pot, the crossfire air delivery manifold being adapted to deliver air to the combustion chamber at approximately a right angle to the air delivered by the overfire air delivery manifold;

a flame trap positioned over the combusion end of the pot means, the flame trap being adapted to confine combustion of the bio-mass fuel to the area within the periphery of the combustion end of the burn pot;

air injection means including an injection air tube extending through the enclosure, the air injection tube being attached to the underfire air delivery manifold, the overfire air delivery manifold and the crossfire air delivery manifold, the injection air means being adapted to deliver ambient air to the combustion chamber at a pressure higher than the ambient air pressure;

an exhaust duct opening into the combustion chamber;

a heat exchanger attached to the exhaust duct, the heat exchanger being adapted to recive combustion gasses from the combustion chamber through the exhaust duct;

an extraction air tube attached to the heat exchanger;

an exhaust air fan attached to the extraction air tube, the exhaust air fan being adapted to extract exhaust gasses from the combustion chamber through the exhaust duct and the heat exchanger;

an injection air control valve attached to the enclosure, the injection air control valve being adapted to control the flow of air into the injection air tube; and an extraction air control valve, the extraction air control valve being adapted to control the amount of exhaust gasses being extracted from the combustion chamber.

15. The bio-mass fuel burning heater of claim 14, further comprising;
   a fuel storage hopper having a lower fuel delivery end, the lower delivery end being in communication with the lower fuel feed end of the burn pot; and
   fuel feed means for delivering the fuel from the hopper to the combustion end of the burn pot.

16. The bio-mass fuel burning heater of claim 14, wherein the burn pot is of double-walled construction, having an outer wall and an inner wall, with a plenum being defined between the outer and inner walls, with ports extending through the inner wall below the periphery of the combustion end of the burn pot, and further with ports extending through at least a portion of the periphery of the combustion end of the burn pot;
   wherein the ports through the inner wall comprise the underfire air delivery manifold; and
   wherein the ports extending through the periphery of the combustion end of the burn pot comprise the crossfire air delivery manifold.

17. The bio-mass burning fuel heater of claim 14, further comprising:
   control means for controlling the rate of feed of bio-mass fuel from the hopper to the burn pot.

18. The bio-mass fuel burning heater of claim 14, further comprising:
   insulating means between the combustion chamber and the storage hopper for insulating the storage hopper from the combustion chamber.

19. The bio-mass fuel burning heater of claim 14. further comprising:
   a circulating fan, adapted to circulate ambient air through the enclosure around the heat exchanger and combustion chamber to blow heat from the combustion chamber and the heat exchanger into the area surrounding the heater.

20. The bio-mass fuel burning heater of claim 14, wherein the combustion chamber is sealed.

21. The bio-mass fuel burning heater of claim 14, further comprising:
   an underfire air delivery tube, the underfire air delivery tube being attached to the inner wall of the burn pot and extending from the inner wall of the burn pot to a level approximately to the underfire air delivery manifold, the underfire air delivery tube having an open central air column extending into the plenum between the inner and outer walls of the burn pot.

* * * * *